INVENTORS
ALF HUNDERE
HEINZ G. BUSCHFORT
ATTORNEYS

FIG. 4

INVENTORS
ALF HUNDERE &
HEINZ G. BUSCHFORT

INVENTORS
ALF HUNDERE
HEINZ G. BUSCHFORT
ATTORNEYS

United States Patent Office 3,499,310
Patented Mar. 10, 1970

3,499,310
SELF-CALIBRATING TEMPERATURE SENSING PROBE AND PROBE - INDICATOR COMBINATION
Alf Hundere and Heinz G. Buschfort, San Antonio, Tex.; said Buschfort assignor to Alcor Aviation, San Antonio, Tex.
Continuation-in-part of application Ser. No. 651,221, July 5, 1967. This application May 27, 1968, Ser. No. 732,286
Int. Cl. G01k 15/00
U.S. Cl. 73—1         9 Claims

ABSTRACT OF THE DISCLOSURE

A temperature sensing probe composed of a sheath having therein a temperature sensing element capable of exhibiting a signal indicative of the temperature sensed, the element being embedded in a body of fixed melting point material. A signal indicator permits reading the temperatures sensed by the probe. When the temperature of the probe is changed past the fixed melting point, the temperature indication will remain constant at the fixed melting temperature during phase change.

BACKGROUND OF THE INVENTION

This application is a continuation-in-part of our prior copending application Ser. No. 651,221, filed July 5, 1967, now abandoned.

Temperature sensors or sensing elements, which exhibit an electrical or other type signal indicative of the temperature sensed are each old. Such sensors conventionally are combined with and mounted in a sheath of uniform outer diameter to provide a sheath type probe. Such sensors include thermocouples and thermistors and the like. The terms "sensor" and "sensing element" are used in this description and the following claims to mean the thermocouple junction or the actual temperature sensing part of the thermistor or the like and not to include any sheath or wrapping or protective covering. A sensor or sensing element in a uniform diameter sheath forms a "probe" as used herein. In such a probe the sheath is normally made as small as feasible while leaving some space, frequently filled with comminuted insulation, between it and the sensing element. Further, it is old to calibrate such sensors in many ways. However, the difficulty is that the read-out devices and associated sensors must be calibrated preferably in combination, and also at intervals because they are subject to change and therefore their indications became subject to error with time. Thus there has been a need for a means of readily and easily calibrating such temperature read-out devices and associated sensors. It is also old in factory or laboratory calibration of probes to immerse the probe in a bath of fixed melting point material, such as water, lead, tin, etc., heat or cool the bath through a temperature range including the fixed melting point, and note the indicated temperature during change of phase, liquid to solid or solid to liquid. This procedure requires the availability of the appropriate bath and heating or cooling means therefor and is quite time consuming. In the British Patent to Moores, No. 1,020,574, published Feb. 23, 1966, it is proposed to mount permanently around the temperature sensing end of the probe, an additional container having therein a body of fixed melting point material so that the probe might be calibrated without removing it from its normal operating location. However, such a probe is by nature oversized compared to the requirements of size for the probe itself, and hence its use is limited to those situations in which the oversize may be tolerated.

It is an object of the present invention to devise a temperature sensing probe that has incorporated therein as part of the probe itself a fixed melting point material in such a way as to make it possible to calibrate such probe and any type indicator associated with such probe in a temperature indicating system, without necessity for external special temperature baths or special equipment, and in some cases, at least, without even removing it from its temperature sensing service location.

Further, it is an object of the present invention to devise such a probe in which the fixed melting point material will change phase under the operating conditions of temperature change in the environment to be sensed.

Another object is to provide such a probe in which the necessary heat required to produce calibration may be produced in or adjacent the probe itself.

Another object is the method of calibrating indicators utilizing a temperature sensing probe of the construction embodied in the present invention.

SUMMARY OF THE INVENTION

The above-mentioned problems of the prior art are solved and the above objects achieved by the following structures:

A temperature sensing element is placed in permanent and intimate heat transmitting relation with a material having a single precise and constant temperature at which it melts or solidifies, such phase change temperature being known. Preferably the material used is one in which such phase change comes within the usual operating range of the temperature sensing element and associated indicator. The total heat of change of state of the quantity of material present should be sufficiently large, under the selected or available rate of heating or cooling of the sensor probe, to cause the temperature of the material and the element to remain constant for a period of time sufficient to establish the value of the indicated temperature; i.e., to read the meter or temperature chart during the change of phase. The difference between the indicated or recorded temperature and the established true temperature of the selected fixed melting point material is the instrument error for which appropriate correction can be made.

The rate of heat application to or removal from the probe prior to and during the change of phase should preferably be substantially constant and of a small enough value that the read-out device, such as a range meter or recorder, can readily follow temperature changes with accuracy while at the same time being greater enough so that the read-out device will provide an observable change in indicated temperature with time other than during the phase change. For a pointer type indicator is must be possible to detect point of stoppage during the time required for the phase change, as contrasted with its movement during temperature changes. The total heat required to change the temperature of the probe through the calibrating range should also be small enough relative to the rate of heat transfer so that the calibration time will not require suspension of the regular sensing service or the time of the operator to an objectionable degree.

Further, in accordance with the present invention, such a temperature sensing element is embedded in such fixed melting point material and located in a tube adjacent a closed end thereof to form an integrated probe structure, and such tube carries or provides signal conducting leads connected to said element and leading from said tube so as to obtain a signal from such element.

Also, the invention includes the method of calibrating a temperature sensing system having therein the devices briefly described above, in which method the probe is subjected to temperature change through a range including such melting point so that the temperature may be observed changing with respect to time before and after a pause in movement that is indicative of such phase change temperature, and observing the indicated temperature at the time of phase change to establish the error.

BRIEF DESCRIPTION OF THE DRAWINGS

A probe and system as outlined above are hereinafter described in detail and illustrated in the accompanying drawings, in which.

DESCRIPTION OF THE PREFERRED EMBODIMENTS

Figure 1:
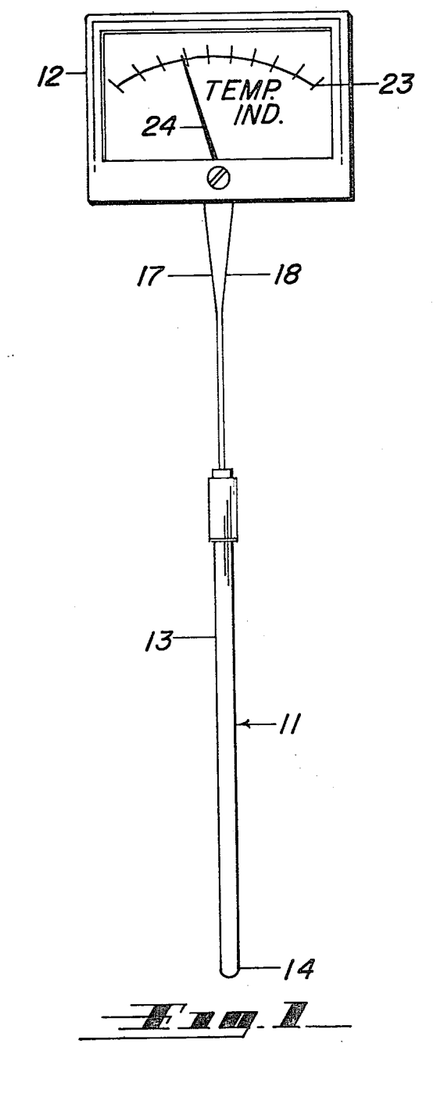
FIG. 1 is an elevational view of a probe embodying the present invention and shown in a system with a range type temperature indicator.

In the accompanying drawings, FIG. 1 embodies an elevational view of an elongated thermocouple probe 11 designed to be inserted into position for measuring temperature into a selected environment and having incorporated therein features of the present invention, together with a schematic showing of a range indicating meter 12 connected in circuit with said probe. Details of the probe are shown in the sectional views of FIGS. 2 and 3. As shown in FIG. 1, however, the probe 11 has a sheath 13 that is closed at its lower end 14 by a continuation of the metal of the side walls of the sheath. Within the lower end of the sheath and adjacent the closed end 14 is located a thermocouple or other element adapted to sense temperature conditions in the environment in which it is located and to transmit a signal indicating the temperature so sensed. The signal may be electric in nature as in the case of a thermocouple or may be of a non-electric nature depending upon what sort of temperature sensing element is employed. A probe thus made up of a sensor inside of a sheath will be referred to hereinafter as a sheath type temperature sensing probe.

In the case of the use of a thermocouple junction, such junction is the sensing element or temperature sensor. In accordance with this invention the temperature sensor or sensing element is embedded or otherwise in heat transmitting relation to a body of material 21 (FIG. 2) having a single precise temperature at which it changes phase. The phase change may be either solid-to-liquid or liquid-to-solid.

Sheath type probes such as above mentioned consisting merely of the thermocouple junction 16 located within a sheath such as 13 near the closed end 14 thereof and having leads extending to the outside of the sheath are commonly in size of the order of ⅛ inch in diameter. They can be even less than 1/16 of an inch or more than ¼ of an inch. Likewise the length of such a probe can vary from less than 1 inch to more than a foot. The present invention is intended for application to all sizes and types of probes of the order indicated.

Figure 2:
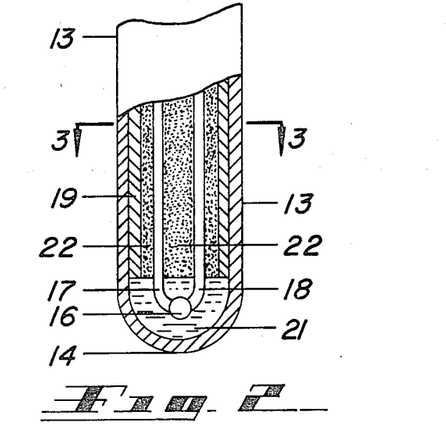
FIG. 2 is an enlarged axial sectional view of a portion of the probe of FIG. 1 at the lower closed end thereof.
Figure 3:
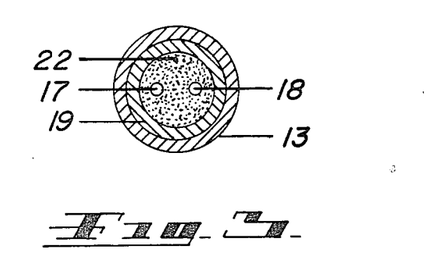
FIG. 3 is a transverse section on the line 3—3 of FIG. 2.

Referring back to FIG. 2, as well as to FIG. 3, which is a transverse sectional view through FIG. 2, there is an insulating material 22 normally employed in embedding relation about the thermocouple leads extending toward the open end of the sheath 13. Such insulating material 22 overlies and confines the body of material 21 of fixed melting point and is preferably coated with a sealant over the area where it contacts the material 21 in all those cases in which the density of the material 22 is not sufficient to retain the material 21 when the latter is in its liquid state, or under all those conditions in which there is a chemical or other reactive tendency between the two materials. Thus, the effect is that the fixed melting point material 21 occupies the space normally occupied by insulation between the sheath and sensing element of the probe and embeds such element. Also, the thermocouple wires 17 and 18 and the junction 16 should be coated if there is any tendency for the material 21 to react with or attack the thermocouple and the junction wires. The sheath material 13 and 14 and the inner sheath 19 should also be of material which is nonreactive with the material 21 or suitably coated in all mutually contacting areas. However, care should be taken that any such coating material shall not have such a heat insulating quality that it will prevent the adequate transmission of heat between the material of the sheath, the material of the fixed melting point material 21, and the material of the thermocouple and its leads.

As an example, the fixed melting point material may be a copper-silver eutectic that has its melting point at 1435° F., and the leads, one of Alumel and one of Chromel. Other temperature ranges for operation of the probe and its system may require other fixed melting point material and other thermocouple wires. Information as to such materials may be found in standard handbooks and textbooks. If the fixed melting point material is electrically conductive, the junction 16 will also be grounded to the sheath 13 and the sheath itself may in turn be grounded. As is usual, thermocouple systems may be operated with the junction grounded or ungrounded. Also, as usual, the leads 17 and 18 are connected to the meter 12 (FIG. 1), the electrical circuitry of which is not shown as its details form no part of this invention and many suitable forms are well known to the art. A characteristic of the meter of this particular illustration is that there is on the face of the meter a scale 23 of temperature graduation that includes the temperature of the melting point of the fixed melting point material 21, and that there is a pointer 24 or other scanner that moves along the scale in response to electrical potential of the junction 16. The fixed melting point material 21 preferably surrounds the junction 16 so as to have a minimum temperature gradient between the junction and the material 21.

Figure 4:
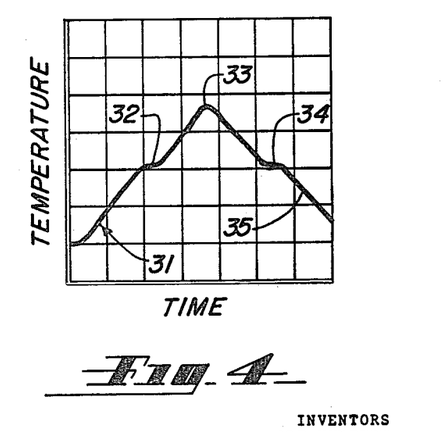
FIG. 4 shows a graphical record of a typical variation of temperature which time as obtained by a recorder during a calibration sequence.

A typical graphical result of the operation of the embodiment just described in calibrating the combination of the probe and the instrument 12 is shown in FIG. 4 in which the temperature indicated by the meter 12 has been plotted against time.

The graph of FIG. 4 has a temperature-time curve generally indicated at 31. That portion of the curve to which the numeral 31 points shows the temperature increasing with time as the result of heat application to the sensor probe 11. With substantially constant heat application to the temperature sensor probe, a uniform change in temperature with respect to time is attained until the solid-to-liquid phase change temperature of material 21 is reached, at which time the temperature will abruptly cease to change with time and will remain constant for a brief period during which the phase change will take place.

This constant temperature portion of the calibration process is indicated by the numeral 22 and it is noted that after the phase change has been completed continued application of heat at a substantially constant rate will cause the curve to resume its previous slope and this will continue until the application of heat is discontinued. Such point is indicated at 33 and from this point after the termination of application of heat, the temperature will fall with time at a substantially constant rate until again the temperature will be reached at which the material 21 changes phase, this time from liquid back to solid. While passing through this phase change the temperature will again remain constant as indicated at 34 and upon completion of the phase change and the conversion of all of the material 21 to solid, the curve will again resume substantially the same downward inclination as before and as indicated by the numeral 35.

Figure 5:
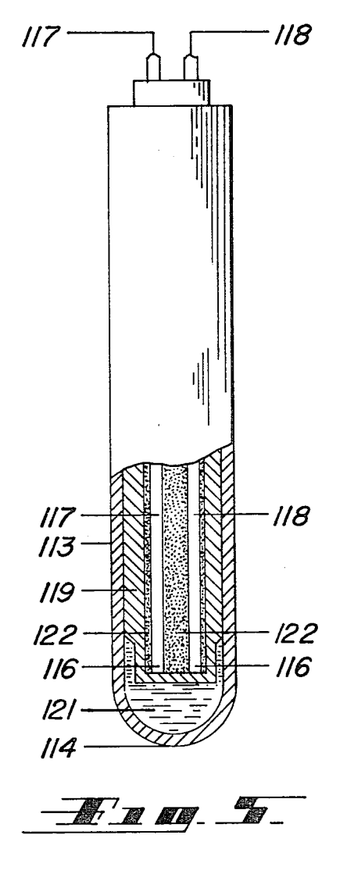
FIG. 5 is a view similar to FIG. 2 illustrating a modification wherein the fixed melting point material is separated from the insulating material surrounding the temperature sensing element and that element itself.

FIG. 5 shows a modification of the invention in which the fixed melting point material is separated from the thermocouple junction so as not to be in contact therewith. In this figure the outer sheath is designated as 113 having its closed end shown at 114. Inside the sheath are shown the thermocouple leads 117 and 118, the exterior of which may be connected to an instrument such as the instrument 12 of FIG. 1. Within the sheath, except at a point adjacent and within the closed end of the sheath, the leads 117 and 118 have insulation material 122 surrounding them. The fixed melting point material 121 is shown substantially filling the closed lower end 114 of the sheath.

Separating the leads 117 and 118 from the fixed melting point material is a second or inner sheath, 119, In this instance the thermocouple junction is shown between the respective leads 117 and 118 at the points where they engage the closed lower end of the inner sheath 119, as indicated by the numeral 116.

As will readily be seen, the inner sheath 119 effectively separates the leads 117 and 118 and the junction 116 from actual contact by the fixed melting point material 121 so as to avoid actual contact therewith. However, as in each of the other forms, the arrangement must be such as to provide for rapid heat transfer between the fixed melting point material 121 and the temperature sensor here shown as the thermocouple junction 116.

Figure 6:
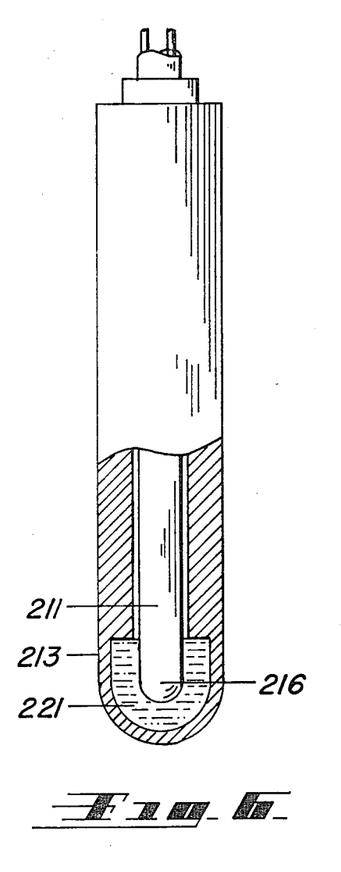
FIG. 6 is a view similar to FIG. 5 but shows another modification.

FIG. 6 illustrates another alternate design. The probe 211 in this case is a substantially conventional sheath type temperature sensing probe as hereinbefore described. The end 216 of this probe acts as the sensor and is immersed in a fixed melting point material 221. The probe 211 can be removed from the outer sheath 213 at such time as the body of material 221 is sufficiently fluid to permit such removal, or at any time provided that the material 221 is of such a nature that when solid it is not bonded to or does not grip the lower end of the probe sheath at 216.

It is noted that in FIG. 6 when the probe 211 is within the outer sheath 213, the sheath type temperature sensing probe 211 becomes in effect a temperature sensing element and the outer sheath 213 becomes the outer sheath of the probe and confines the body 221. The outer sheath 213 may be provided by what is normally termed a thermocouple well which forms a part of a device whose temperature is to be sensed, and constitutes a well to removably receive a temperature probe, as known in the thermocouple art.

Figure 7:
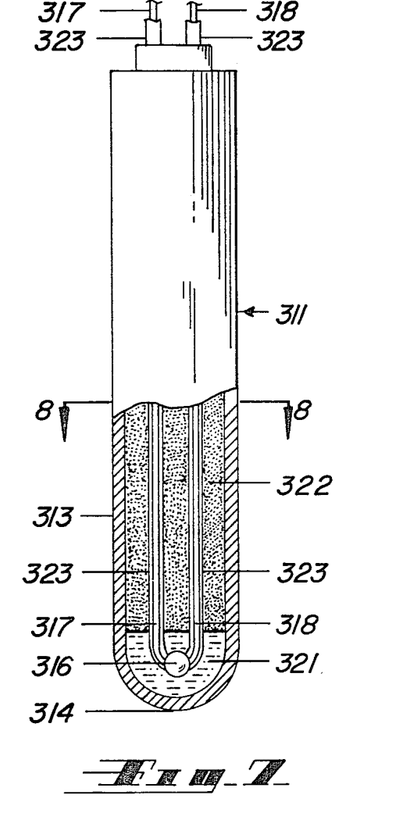
FIG. 7 is a view also similar to FIG. 5 and illustrates another modification.
Figure 8:
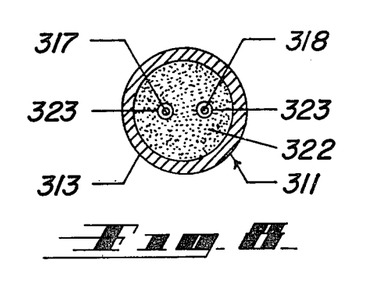
FIG. 8 is a transverse section on line 8—8 of FIG. 7.

The modification shown in FIGS. 7 and 8 is quite similar to that illustrated in FIGS. 2 and 3, but instead of the employment of a thermocouple, this probe 311, which has a sheath 313 with a closed end 314, is intended to illustrate as the temperature sensing element a thermistor 316. Thermistors as temperature sensors are well known in the art but do not produce an electrical potential in and of themselves as do thermocouples. Rather, they have varying resistance with temperature. This being true, the leads 317 and 318 may both be of the same material such as copper but must be insulated from the fixed melting point material 321 by suitable insulating material 323 surrounding each lead, and should be supported by suitable insulating material such as 322 which substantially fills the space about the insulated leads 317 and 318 within the outer sheath 313 and above the body 321 of fixed melting point material.

Insulation is not shown on the thermistor 316 because thermistors are normally covered with appropriate insulation and the illustration being diagrammatic is intended to illustrate the normally externally insulated thermistor which is thus appropriately insulated. The material 321 may be the same as that previously disclosed. Since a thermistor operates on the basis of resistance varying with its temperature, it is necessary for the thermistor and the lead wires to be electrically insulated from the fixed melting point material. However, the heat conductivity through such insulation should be maintained as high as possible by appropriate selection of the material and care in the assembly of the device to maintain as good a thermal contact as possible between the different components. In connecting the leads 317 and 318 to a meter such as the meter 12 of FIG. 1, there would, of course, be interposed in the same a suitable circuitry for indication of the resistance of the particular thermistor used.

The method of using all of the modifications disclosed in FIGS. 1 through 8 is substantially the same. Heat is applied to or taken from the probe to cause a change in the temperature indication thereof by a meter such as the meter 12, causing the meter pointer to travel along the scale 23 as a function of time.

The travel of the pointer during heat application will be observable and continuous if the application be reasonably constant and at a rate to make change readily observed, until the temperature of the sensing element such as indicated by the numerals 16, 116, 216 and 316 reaches the melting point of the material 21, 121, 221 or 321. At such point such material will change phase from solid to liquid, in the case of the application of heat as distinguished from the withdrawal of heat. At this point, the material will absorb heat for a period of time without changing temperature. During this time the pointer will remain fixed with respect to the scale. If some other indicator be employed such as a recorder, the graph produced thereby will show a constant temperature portion such as 32 in FIG. 4. This point of the indicated temperature on the scale during which non-movement of the pointer 24 is observed, should be then noted as the point indicated by this system at which the temperature of the probe is precisely that of the fixed temperature for the change of phase of the fixed melting point material. The difference between this indicated temperature on the instrument 12 and the established melting point for the material in question is the calibration error of the instrument and should be applied to all readings of the instrument until further calibration indicates a different calibration error.

If the indicator is in the form of a temperature recorder, the indicated phase change temperature can be read from the temperature chart. The calibration error so established is calibration of the system including the probe, the meter, and their related circuitry. Due to the fact that the fixed melting point material is always in contact thermally with the sensor, that is, in heat transmitting relation thereto, this calibration may be made at any and every time the material goes through its phase change under condition of heating or cooling of the probe so that the condition of constant temperature during phase change can be distinguished. When the probe is inserted into an object or material for monitoring temperature, the accuracy of the temperature indicating system may be checked during normal operation if and as the temperature goes through the phase change point of the material 21, or the temperature sensing probe element may be heated or cooled to cause such temperature variation.

The following Table I presents typical fixed melting point materials to illustrate possibilities applicable to this invention:

TABLE I.—TYPICAL FIXED MELTING POINT PHASE CHANGE MATERIALS

|  | M.P.,* °F. | Heat of fusion | |
| --- | --- | --- | --- |
|  |  | g. cal./gm. | g. cal./cc. |
| Mercury, Pure | −38 | 2.82 | 38.2 |
| Binary Eutectic, K-Na | 14 |  |  |
| Water, Pure | 32 | 79.7 | 79.7 |
| Gallium, Pure | 86 | 19.2 |  |
| Phosphorus, Pure | 111 | 5.03 |  |
| Quinary Eutectic, Bi-Pb-Sn-Cd-In | 117 |  |  |
| Potassium, Pure | 145 | 15.7 | 13.7 |
| Quaternary Eutectic, Bi-Pb-Sn-Cd | 158 |  |  |
| Naphthalene, Pure | 176 |  |  |
| Ternary Eutectic, Bi-Pb-Cd | 197 |  |  |
| Ternary Eutectic, Bi-Pb-Sn | 203 |  |  |
| Sodium, Pure | 208 | 31.7 | 30.8 |
| Binary Eutectic, BiPb | 256 |  |  |
| Binary Eutectic, Bi-Sn | 281 |  |  |
| Ternary Eutectic, Pb-Sn-Cd | 288 |  |  |
| Binary Eutectic, Bi-Cd | 291 |  |  |
| Indium, Pure | 314 |  |  |
| Binary Eutectic, Sn-Cd | 351 |  |  |
| Binary Eutectic, Pb-Sn | 362 |  |  |
| Lithium, Pure | 367 | 154 | 82.3 |
| Tin, Pure | 449 | 13.8 | 101.0 |
| Ternary Eutectic, Pb-Sn-Sb | 462 |  |  |
| Binary Eutectic, Pb-Sb | 477 |  |  |
| Binary Eutectic, Cd-Zn | 508 |  |  |
| Bismuth, Pure | 520 | 10.2 | 100.0 |
| Ternary Eutectic, Pb-Sn-Ag | 588 |  |  |
| Thallium, Pure | 576 | 3.7 | 44.2 |
| Cadmium, Pure | 610 | 10.8 | 93.3 |
| Lead, Pure | 621 | 5.47 | 62.1 |
| Zinc, Pure | 787 | 23.0 | 164.0 |
| Tellurium, Pure | 840 |  |  |
| Binary Eutectic, Sb-Ag | 932 |  |  |
| Lead Chloride, Pure | 934 |  |  |
| Binary Eutectic, Al-Ag | 1,058 |  |  |
| Antimony, Pure | 1,167 | 3.9 | 25.8 |
| Magnesium, Pure | 1,202 | 47.6 | 82.9 |
| Aluminum, Pure | 1,220 | 94.0 | 254.0 |
| Barium, Pure | 1,300 |  |  |
| Binary Eutectic, Cu-Ag | 1,435 |  |  |
| Corium, Pure | 1,460 |  |  |
| Sodium Chloride, Pure | 1,474 |  |  |
| Arsenic, Pure | 1,497 |  |  |
| Calcium, Pure | 1,560 |  |  |
| Binary Eutectic, Cu-Au | 1,634 |  |  |
| Silver, Pure | 1,760 | 26.0 | 273 |
| Cooper, Pure | 1,981 | 49.0 | 435 |

*Melting point or freezing point

Figure 9:
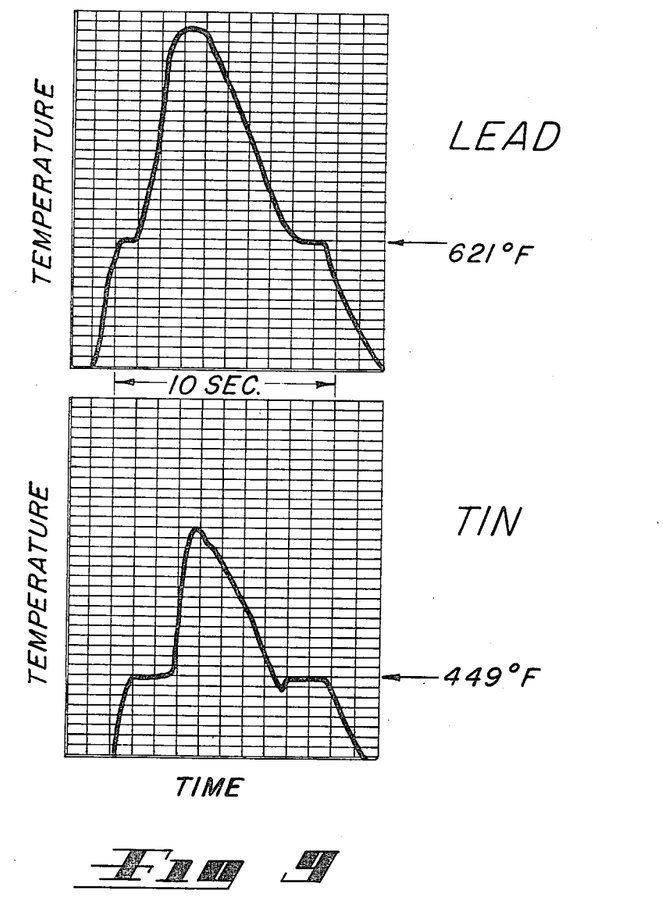
FIG. 9 shows comparative time-temperature graphs of actual calibrations of similar probes employing lead and tin, respectively, as fixed melting point materials in accordance with this invention.

In FIG. 9 actual temperature time charts for two common materials, tin and lead are presented. The probes used in obtaining these charts had the configuration of FIG. 2 and had an outside diameter of ⅛ inch. As will be noted from Table I, tin has a heat of fusion of 101 gram calories per cubic centimeter compared to 62.1 for lead. It will be noted from FIG. 9 that the hesitation temperature, i.e., the time required for phase change, is greater for tin than for lead.

It will also be noted from FIG. 9 that tin shows a small but sharp rise in the curve during cooling just as the freezing point is reached. This was found consistently repeatable for tin and is attributed to super-cooling.

In accordance with this invention, the following requirements need to be met to insure the maximum degree of success:

(1) The heat flow to or from the sensing element during calibration should be reasonably constant within the limits heretofore stated and at a value that will give a rate of change of temperature with time which will cause the pointer of the temperature indicator to have observable motion, but not so great that the indicator cannot follow accurately.

(2) The hesitation time $t$ or the time required for the phase change, must be great enough to be readily observed in contradistinction to the movement of the pointer observable at other times as above stated. To maintain a constant value of $t$ with different fixed melting point materials of varying heats of fusion and different size temperature sensing elements, the following relationship should be maintained constant within reasonable limits. This provides a good rule of thumb but assumes that all fixed melting point materials have the same heat capacity and thermal conductivity which is not the case and hence does not provide good mathematical accuracy.

$$F(V_f/V_e)$$

where $F$ = volumetric heat of fusion in kilogram calories per cubic centimeter
$V_f$ = volume of fixed melting point material
$V_e$ = volume of the temperature sensing element and associated parts embedded in the fixed melting point material.

To check the validity of the above relationship, thermocouples incorporating this invention were made using aluminum and antimony as fixed melting point materials. The configuration was in accordance with FIG. 2. These two materials were selected because of the close melting points, 1220° F. (aluminum) and 1167° F. (antimony) with almost a ten-fold difference in volumetric heats of fusion, 25.8 gram-calories per cc. (antimony) and 254.0 gram-calories per cc. (aluminum). Table II below presents the results obtained. The above equation was checked with respect to the effect of $V_f/V_e$ and cooling rate and it is surprising that antimony had essentially the same hesitation time $t$ as aluminum even though its volumetric heat of fusion is only ⅒ that of aluminum. The difference is attributed to the difference in thermal conductivity, heat capacity, and wetting factor (the ability of the phase change material to wet the surfaces it contacts to obtain good heat transfer).

TABLE II

| Metal | $V_f/V_e$ | Cooling rate °F./sec. | Hesitation time, t, sec. |
| --- | --- | --- | --- |
| Aluminum | 8 | 7.5 | 4.3 |
| MP 1,220° F. | 8 | 27.5 | 2.0 |
| HF 254.0 g.-cal./cc. | 8 | 42.5 | 1.4 |
|  | 16 | 7.5 | 5.4 |
|  | 16 | 27.5 | 3.1 |
|  | 16 | 42.5 | 1.8 |
| Antimony | 16 | 7.5 | 4.8 |
| MP 1,167° F. | 16 | 27.5 | 3.3 |
| HF 25.8 g.-cal./cc. | 16 | 42.5 | 2.4 |

For practical considerations, to meet the requirements of this invention the ratio $V_f/V_e$ should be within reasonable limits. If $V_f/V_e$ is less than 2, the hesitation time $t$ would normally be too difficult to detect. On the other hand, if $V_f/V_e$ is greater than needed for $t$ to be distinguishable, the response time in the probe is increased more than necessary. From the probe construction standpoint, the practical range of the ratio $V_f/V_e$ is in the order of five (5) to thirty (30). However, if the thermocouple response time is not a primary factor in a particular case and the hesitation time $t$ is not limited to a short period, then the ratio $V_f/V_e$ could be as much as 250.

The forms of the invention illustrated in FIGS. 1 through 8, inclusive, require the application of heating or cooling from the exterior of the probe either from the environment whose temperature is normally to be sensed by the probe or from some other source which may or may not require the withdrawal of the probe from the environment whose temperature is normally to be sensed. The forms now to be described, which are disclosed in FIGS. 10 through 19, inclusive, provide within or as an integrated part of the probe means for the application of heat or cooling thereto in order to carry out the calibration at will. This is of importance in those cases in which the temperature being sensed by the probe does not normally vary over a range to include the melting point of the fixed melting point material or it is not possible or convenient to change the temperature through a sufficient range to make possible the calibration of the probe as heretofore explained, and in which it is either undesirable to remove the probe from the environment whose temperature is to be sensed for the purpose of effecting the calibration or in which it is inconvenient to supply additional apparatus for the purpose of heating or cooling the probe in effecting calibration after removing the same from its normal operating environment.

In FIGS. 10 to 19, inclusive, there is in each case incorporated into the probe assembly heating and/or cooling devices operable to bring about a change in temperature of the probe and a consequent change of phase of the fixed melting point material surrounding the temperature sensing element so as to make possible the calibration of the probe and the associated metering or recording means.

Figure 10:
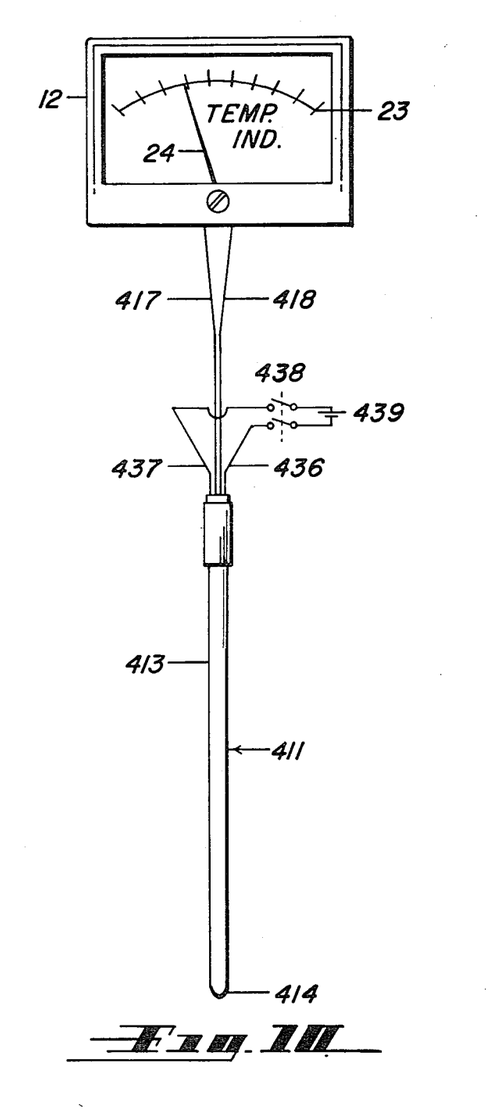
FIG. 10 is a view similar to FIG. 1 but in which an auxiliary heater with an external energy supply source is incorporated to provide the temperature variation necessary to carry out the calibration sequence.

In FIG. 10 the meter 12 and its associated scale and pointer 23 and 24, respectively, may be the same as in FIG. 1. Likewise, the probe 411 may be essentially the same as that in FIG. 1 in that it employs a sheath 413 with a closed end 414 and has signal conducting leads 417 and 418 for conducting therefrom to the meter 12 the signals to be produced by the temperature sensing element within the sheath 413.

Additionally, FIG. 10 shows leads 436 and 437 extending from the probe and adapted to be connected through a switch 438 to a source of electrical energy such as the battery 439.

Figure 11:
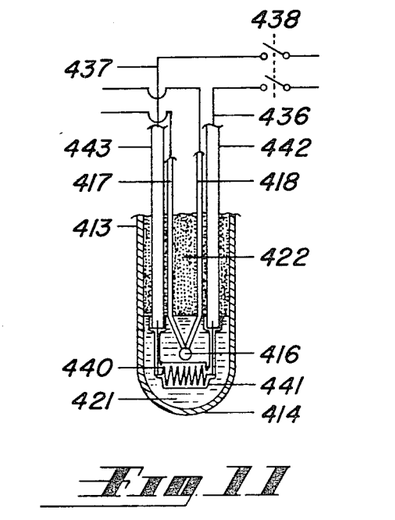
FIG. 11 is a view similar to FIG. 2 showing one desirable auxiliary heater arrangement and a means of supplying energy thereto.

Referring to FIG. 11 which shows one form of interior of the probe 411, it is to be noted that it contains in similar fashion to FIG. 1 a fixed melting point material 421 surrounding a temperature sensing element 416 having leads 417 and 418 extending therefrom out through the upper end of the probe.

In accordance with this form of the invention, however, there is additionally located within the body 421 a suitable heat source such as the electric heater 440 disposed within a cavity 441 in the body 421. Such cavity 441 may be preserved during periods in which the body 421 is fluid by forming the cavity 441 with a shell of suitable material that will remain solid while the body 421 is fluid. Such shell should, of course, have extensions thereon for conduction of the power supplying leads 436 and 437 from the heater 440, and suitable conduits for such leads will also be provided through the insulating body 422 as indicated at 442 and 443.

When it is desired to check the calibration of the temperature indicating system of FIGS. 10 and 11, the switch 438 is turned on and maintained closed until the temperature of the body 421 rises sufficiently to exceed the melting point of the material of that body and is then turned off. If the rate of application of heat through the heater 440 be such as to render the observation of the meter 12 appropriate for calibration during the application of heat then such calibration may be carried out during the heating portion of the sequence as heretofore described. It is noted that if the source of electricity for supply of such heat be substantially constant the heating will be at a substantially constant rate, thereby complying with one of the desirable conditions heretofore recited. In any event, however, after the temperature rises sufficiently to melt the body 421 or cause it to change phase, the heat source may be shut off by opening the switch 438 and then the meter 12 observed during the cooling portion of the sequence, thereby to establish the calibration of the system in the manner heretofore described.

It is noted that the method employing FIGS. 10 and 11 may be carried out without regard to the fact that the environment whose temperature is being sensed by the probe may remain at a substantially constant temperature or within a range not including the phase change temperature of the material 421, and that it may be carried out while the probe is in place without removing it from its operating environment, or, if desired, may be carried out after such removal.

Figure 12:
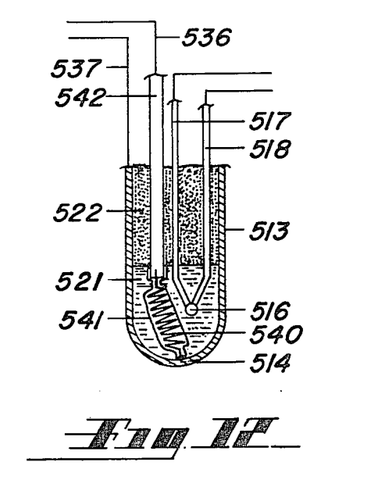
FIG. 12 is a view similar to FIG. 11 showing a modified arrangement of auxiliary heater and energy supply therefor.

With reference to FIG. 12, the sheath 513 with its closed end 514 is shown having a temperature sensing element 516 therein with leads 517 and 518 and with a fixed melting point material 521 surrounding the element 516 substantially the same as in FIG. 11. In this instance, however, the heater 540 which is supplied through leads 536 and 537, and is located in a cavity 541 in the fixed melting point material 521, requires but one lead 542 extending independently from the probe to the exterior thereof. The other lead to the heater 540 is provided by grounding the end of this heater which is opposite the lead 542 to the interior of the sheath 513.

The form of the invention illustrated in FIG. 12 operates in identical fashion to that shown in FIG. 11 but is somewhat simpler in construction and may be employed in those instances in which it is not objectionable for one leg of the power supply to be electrically connected to the sheath.

Figure 13:
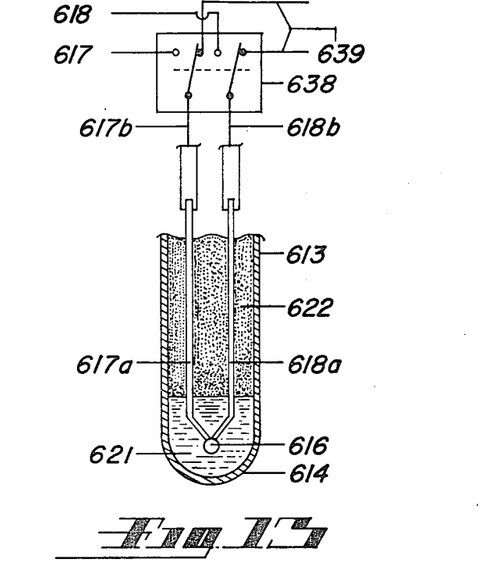
FIG. 13 is a view similar to FIG. 11 but in which the leads for the temperature sensing element are employed also as an auxiliary heater.

Referring now to FIG. 13, there is illustrated a modification of the invention in which the use of a separate heater element and leads therefrom as illustrated in FIGS. 11 and 12 is obviated by so forming the leads from the temperature sensitive element that they act as the heater. In this form the probe likewise has a sheath 613 with a closed end 614 in which is mounted a heat sensitive element 616 within a body of fixed melting point material 621. Extending from the element 616 upwardly from the body 621 and through the insulating material 622 the leads 617a and 618a, for some distance, possibly even to the upper end of the probe, but preferably terminating short of the upper end of the probe, are made of such resistance that upon the application of sufficient power and current source to the exteriors of these leads through the exterior portions 617b and 618b, the interior of the probe may be heated in the same fashion as described in connection with FIGS. 11 and 12. These exterior portions of the leads 617b and 618b are alternatively connected through a switch 638 to the instrument leads 617 and 618, respectively, on the one hand, and to power leads 639, on the other hand, so that power may be supplied from the leads 639 through the switch 638 to cause the lead sections 617a and 618a to supply the desired heat, and when the desired amount of heat has been supplied to raise the temperature sufficiently to change the phase of the material 621, the switch 638 will be changed to connect the leads from the temperature sensing element 616 to the instrument 12.

The operation is substantially the same as in the case of FIGS. 11 and 12, with the exception, however, that inasmuch as during the heating portion of the sequence the heat sensing element 616 will not be connected to the instrument 12 but to the power source, the calibration cannot take place during the heating portion of the sequence. Instead, the heat is applied until the phase change in the body 621 occurs and thereupon cooling is allowed to take place while the temperature sensing element 616 is connected to the meter 12 and calibration is accomplished during the cooling portion of the sequence.

Figure 14:
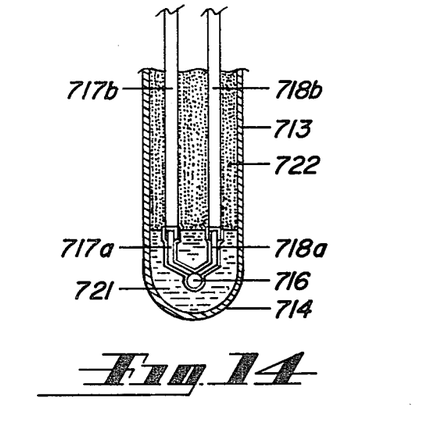
FIG. 14 is a view similar to FIG. 13 also employing the sensing element leads as an auxiliary heater but with the heater portions of such leads limited to the parts thereof within the fixed melting point material body.

The form shown in FIG. 14 is mainly the same as that shown in FIG. 13 and operates in similar fashion. The parts are encased within a sheath 713 closed at its end 714 and include a temperature sensing element 716 within a body of fixed melting point material 721. However, only those portions of the leads from the temperature sensing element 716 which are within the body of fixed melting point material 721 are made of such resistance as to supply heat to the probe as shown at 717a and 718a. Upwardly at 717b and 718b where these leads extend through the insulating material 722 they are made of sufficiently low resistance so that they will not apply substantial heat to the insulating material 722. Thus the heating is confined substantially to the body of fixed melting point material 721 and the heat sensing element 716.

Figure 15:
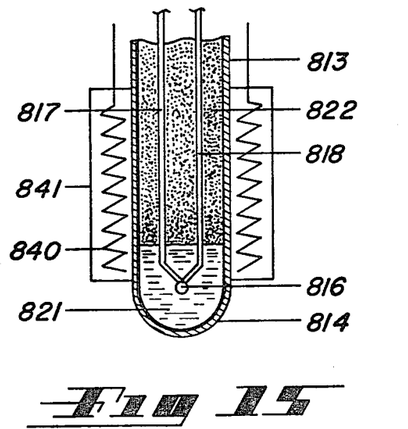
FIG. 15 is a view similar to FIG. 11 but showing an auxiliary heating element bonded to the exterior of the sheath of the probe.

Referring now to FIG. 15, the basic probe is substantially the same as in FIG. 1 and FIGS. 11, 12, 13 and 14. In each case a sheath 813 having a closed end 814 encloses a temperature sensing element 816 which is surrounded by a body 821 of fixed temperature fixed melting point material and the heat sensing element 816 has leads 817 and 818 extending upwardly therefrom through the sheath 813 and through the body of insulating material 822.

In FIG. 15, however, there is shown an arrangement which may be employed in those cases in which it is not objectionable to provide a portion of larger outer dimensions adjacent the temperature sensing end of the probe. Illustrated here in FIG. 15 is a heater comprising a coil or coils 840 enclosed within a housing which is preferably of metal 841 secured to the exterior of the heater sheath in close heat transmitting contact therewith as by soldering or otherwise bonding thereto. This heater and its enclosing housing 841 are preferably mounted far enough up on the probe so as to leave the closed end 814 of the probe exposed to the environment whose temperature is normally to be sensed by the device so as not to interfere with the sensing operation, but extends far enough down so as to fairly directly heat the fixed melting point material body 821 by transmission of heat directly through the sheath 813.

Figure 16:
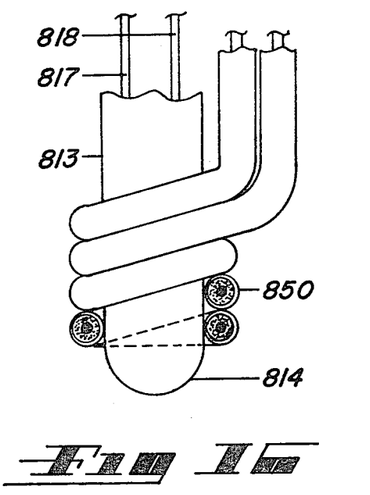
FIG. 16 is a view similar to FIG. 15 showing a different type heater similarly disposed to that shown in FIG. 15.

FIG. 16 is similar to FIG. 15 except that it employs instead of a heater within a housing as shown in FIG. 15, a rod or tube type heater having a metal exterior which is wound around and soldered or otherwise suitably bonded in heat transmitting relation to the exterior of the probe. In this instance the heater coil surrounding the probe is designated by the numeral 850.

Figure 17:
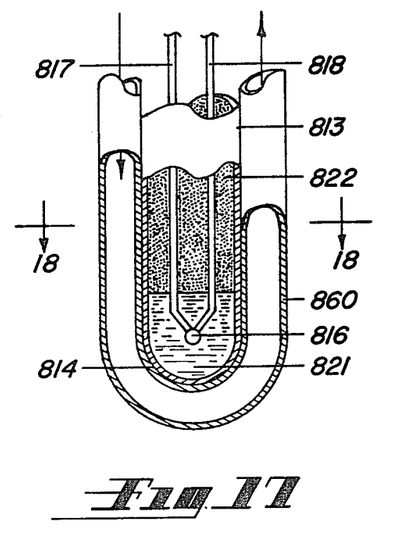
FIG. 17 is a view similar to FIG. 15 but showing a device usable as either heater or cooler bonded to the exterior of the sheath.
Figure 18:
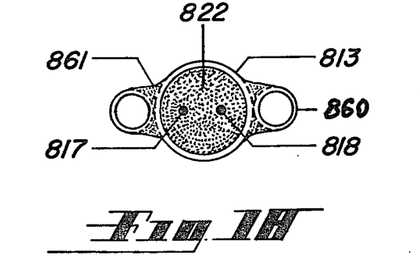
FIG. 18 is a transverse section along the line 18—18 of FIG. 17.
Figure 19:
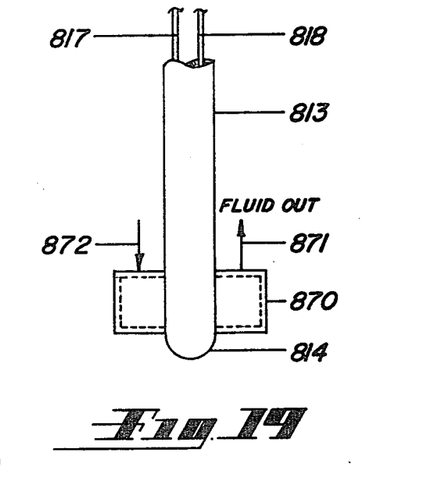
FIG. 19 shows a modified form of heater/cooler.

Finally, with reference to the forms illustrated in FIGS. 17, 18 and 19, these provide a means whereby the change of temperature of the probe in order to carry out the calibrating function may be brought about by the extraction of heat and the resultant lowering of the temperature as well as by the addition of heat in much the same manner as by means of a heater in FIGS. 10 through 16, inclusive. The desirability of a structure in which heat may be extracted rather than added for this purpose is present in those cases in which the normal operating temperature of the probe may be frequently or consistently higher than the range necessary to bring about the change or phase of the fixed melting point material so it is necessary to lower the temperature of the probe in order to pass through the phase change temperature.

In FIGS. 17, 18 and 19, as in FIGS. 15 and 16, the basic probe is the same as in FIGS. 1 and 2 and consists of a sheath 813 closed at its lower end 814 and having therein a temperature sensing element 816 embedded within a phase change body of material 821 with leads from the temperature sensitive element 817 and 818 extending upwardly through the insulating material 822 to the open end of the probe. The provision for heating or cooling in this case is by means of a tubular member 860 extending downwardly from and returning to the upper end of the probe and along that portion exteriorly of the sheath and opposite the body of fixed melting point material 821 it is soldered or otherwise bonded to the sheath with some material of good heat transmission qualities such as solder or the like 861. It will readily be seen that either heat may be added or may be extracted by means of this apparatus depending upon whether a fluid of higher temperature than that prevailing in the probe be forced through the tubular member 860 or whether material of a lower temperature be so employed.

The form shown in FIG. 19 is identical in function with that shown in FIG. 18 except that instead of a tube 860 for carrying a flow of fluid material in heat exchange relationship to the probe, there is provided a jacket 870 surrounding the probe at the appropriate position near the body 821, with suitable tubular conducting means 871 and 872 providing for flow of fluid from and to the jacket 870, respectively. The jacket will preferably be bonded or otherwise secured in good heat transmitting relation to the sheath 813.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a sheath-type temperature sensing probe having a temperature sensing element and a tubular sheath spaced from and surrounding same, the improvement which comprises the combination therewith of a body of fixed melting point material with said fixed melting point within the range said element is capable of sensing, said body being within the sheath in heat transmitting relation with and substantially bridging the space between said sheath and said element, there being also disposed about the exterior of the sheath of said probe and bonded thereto with a heat transmission bonding material an electric heater means for providing a temperature different from the remainder of said probe for changing the temperature of said body of fixed melting point material and said temperature sensing element over a range including the fixed melting point of said material, said last mentioned means being in heat transmitting relation with said body of fixed melting point material and with said temperature sensing element, the electrical leads extending from said heater means to the exterior of said probe for the application of a source of electric power thereto.

2. A probe as set forth in claim 1, in which said electric heater is comprised of portions of said leads.

3. A probe as set forth in claim 2, in which the portions of said leads providing said heater are portions disposed within the body of fixed melting point material.

4. In a sheath type temperature sensing probe having a temperature sensing element and a tubular sheath spaced from and surrounding same, the improvement which comprises the combination therewith of a body of fixed melting point material with said fixed melting point within the range said element is capable of sensing, said body being within the sheath in heat transmitting relation with and substantially bridging the space between said sheath and said element, means for providing a temperature different from the remainder of said probe for changing the temperature of said body of fixed melting point material and said temperature sensing element over a range including the fixed melting point of said material, said last mentioned means being in heat transmitting relation with said body of fixed melting point material and with said temperature sensing element, said means for providing a different temperature being a fluid conductor having an inlet and outlet accessible exteriorly of said probe and being disposed in fixed heat transmitting relation to the portion of said probe containing said temperature sensing element and said body of fixed melting point material to provide heat exchange between fluid contained in said fluid conductor on the one hand and the said temperature sensing element and body of fixed melting point material on the other hand.

5. In a temperature sensing probe; a temperature sensing element having electrical leads extending therefrom, a sheath of substantially uniform outer dimensions along its length having one end closed and said element closely surrounded by and located therein adjacent said end with a space between said element and said end with said leads extending through said sheath and out the opposite end, and means including insulating material closing the space between said leads and said sheath on the opposite side of said element from said closed end; the improvement which comprises a body of fixed melting point material occupying the space between said element and said sheath in embedding relation to the element and confined by the sheath.

6. A probe as set forth in claim 5 in combination with indicating means connected thereto for indicating the temperature being sensed, and in which probe said body has a heat of fusion great enough so that, for a given rate of heat flow to or from the probe and a given temperature indicating sensitivity, the static indication during the phase change of said body between liquid and solid will be readily distinguishable from the changing indication resulting from temperature changes before and after such phase change.

7. A probe as set forth in claim 5 in which there is also incorporated a means for providing a temperature different from the remainder of said probe for changing the temperature of said body of fixed melting point material and said temperature sensing element over a range including the fixed melting point of said material, said last-mentioned means being in heat transmitting relation with said body of fixed melting point material and with said temperature sensing element.

8. A probe as set forth in claim 7 in which said means for providing a different temperature is an electric heater and electrical leads extending therefrom to the exterior of said probe for the application of a source of electric power thereto.

9. A probe as set forth in claim 8 in which said electric heater is contained within said body of fixed melting point material.

References Cited

UNITED STATES PATENTS

| | | |
|---|---|---|
| 2,697,735 | 12/1954 | Knudsen. |
| 3,077,539 | 2/1963 | Blau et al. _________ 73—1 XR |
| 3,270,547 | 9/1966 | MacRitchie et al. _______ 73—1 |
| 3,301,715 | 1/1967 | Gerrard et al. _____ 73—361 XR |

FOREIGN PATENTS

| | | |
|---|---|---|
| 1,020,574 | 2/1966 | Great Britain. |

OTHER REFERENCES

Quigley: Résumé of Thermocouple Checking Procedure, I.S.A. Proceedings, vol. 6, 1951, pp. 64–70. Pp. 66–70 relied upon.

LOUIS R. PRINCE, Primary Examiner

H. C. POST III, Assistant Examiner

U.S. Cl. X.R.

73—359